United States Patent
Franz

(10) Patent No.: US 8,667,028 B2
(45) Date of Patent: Mar. 4, 2014

(54) SYSTEM AND METHOD TO DETERMINE DATABASE SCHEMA IMPACT

(75) Inventor: Joern Amand Franz, Bad Soden am Taunus (DE)

(73) Assignee: AT&T Global Network Services Deutschland GmbH

( * ) Notice: Subject to any disclaimer, the term of this patent is extended or adjusted under 35 U.S.C. 154(b) by 567 days.

(21) Appl. No.: 12/568,460

(22) Filed: Sep. 28, 2009

(65) Prior Publication Data

US 2011/0078113 A1    Mar. 31, 2011

(51) Int. Cl.
*G06F 17/30*    (2006.01)

(52) U.S. Cl.
USPC ......................................... 707/803; 707/809

(58) Field of Classification Search
USPC ........................... 707/803, 610, 620, 634, 809
See application file for complete search history.

(56) References Cited

U.S. PATENT DOCUMENTS

| | | | |
|---|---|---|---|
| 6,223,171 B1 | 4/2001 | Chaudhuri et al. | |
| 6,523,036 B1 | 2/2003 | Hickman et al. | |
| 7,484,212 B2 | 1/2009 | Hellerstein et al. | |
| 7,574,483 B1 | 8/2009 | Alger et al. | |
| 7,580,941 B2 | 8/2009 | Narasayya et al. | |
| 7,680,767 B2 | 3/2010 | Adya et al. | |
| 7,720,884 B1 | 5/2010 | Gandhi et al. | |
| 7,831,621 B1 | 11/2010 | Banks et al. | |
| 7,853,554 B2 | 12/2010 | Wan | |
| 7,941,463 B2 | 5/2011 | Tsyganskiy et al. | |
| 7,953,744 B2* | 5/2011 | Gharat et al. | 707/758 |
| 8,041,687 B2* | 10/2011 | Chen et al. | 707/690 |
| 8,121,978 B2* | 2/2012 | Wiss et al. | 707/615 |
| 8,458,654 B2* | 6/2013 | Ahadian et al. | 717/113 |
| 2002/0095430 A1* | 7/2002 | Egilsson et al. | 707/104.1 |
| 2003/0172368 A1 | 9/2003 | Alumbaugh et al. | |
| 2005/0071359 A1 | 3/2005 | Elandassery | |
| 2006/0101097 A1* | 5/2006 | Barboi et al. | 707/204 |
| 2006/0136471 A1 | 6/2006 | Ge et al. | |
| 2006/0167973 A1* | 7/2006 | Ra et al. | 709/203 |
| 2007/0288495 A1 | 12/2007 | Narasayya et al. | |
| 2007/0299810 A1 | 12/2007 | Riedel et al. | |
| 2007/0299858 A1 | 12/2007 | Norcott | |
| 2008/0147704 A1* | 6/2008 | Godwin et al. | 707/102 |
| 2010/0114962 A1 | 5/2010 | Ahadian et al. | |
| 2010/0153908 A1 | 6/2010 | Sarkar et al. | |
| 2011/0153679 A1 | 6/2011 | Franz | |

OTHER PUBLICATIONS

Hevia, The Usage Dependency Model for Logical Database Design, University of Michigan Computing Research Laboratory, Mar. 1984, pp. 1-19.*

IEEE 100: The Authoritative Dictionary of IEEE standards terms, 7th edition, 2000, p. 1112.*

* cited by examiner

*Primary Examiner* — Albert Phillips, III

(74) *Attorney, Agent, or Firm* — Scott P. Zimmerman, PLLC

(57) ABSTRACT

Database management systems associate a user identifier with an application and monitor access by the application to a database replication. Any changes to a schema associated with the database replication or different instances of the database are identified based on the monitoring. Identified changes are verified and a usage parameter of the database or database replication is analyzed to determine usage data, which can be stored in a database usage repository. A determination regarding the expected impact of an identified change is determined from the usage data.

20 Claims, 3 Drawing Sheets

SYSTEM AND METHOD TO DETERMINE DATABASE SCHEMA IMPACT

BACKGROUND

1. Field of the Disclosure

The present disclosure relates to database management.

2. Description of the Related Art

The schema for a database may be reconfigured resulting in impacts to downstream systems including client applications. Also, databases may be replicated, and a schema for a database replication may change to result in undesired impacts to downstream systems.

DESCRIPTION OF THE EXEMPLARY EMBODIMENTS

Figure 1:
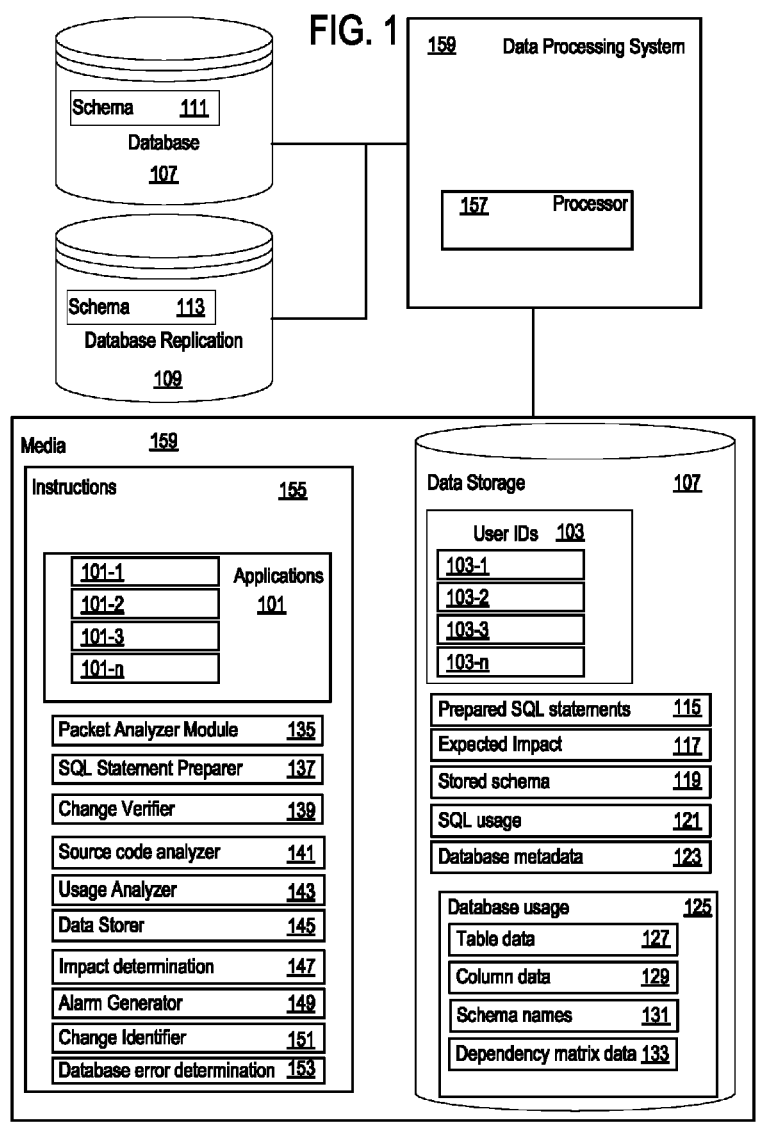
FIG. 1 depicts a system for database management including determining the expected impact of a monitored database schema.

Performing a database schema change analysis on impacted downstream systems (e.g., database clients) can be a cost intensive task that may be dependent on system interface agreements properly describing database usage. The database schema change analysis may be conducted by analyzing changes within a single database or may be conducted by analyzing changes between multiple databases. Downstream impacts that are not identified may result in problems with end-to-end data element flow, which may impact customer facing applications.

Disclosed embodiments assist with automation of database schema repositories, with identification of schema changes, and with automatically comparing database schema usage against changed schemas. Disclosed embodiments may also identify and store SQL usage per database, per application, or per service. In one embodiment, a method of database management includes identifying a change to a schema associated with a single database, verifying the identified change, and analyzing a usage parameter of the database to determine usage data. Verifying the identified change may include performing repeated verification of schema changes by comparing database data for an instance of the database to stored database metadata for one or more other instances of the database. The usage parameter analyzed for the database may include structured query language (SQL) usage data. Accordingly, analyzing the usage parameter may include tracking SQL language. The embodied method further includes storing the usage data to a database usage repository and determining from the stored usage data an expected impact of the identified schema change on downstream clients of the database. In another embodiment, a method of database management includes associating a user identifier with an application, identifying a change to a schema associated with a database replication, verifying the identified change, and analyzing a usage parameter of the database replication to determine usage data. Verifying the identified change may include performing repeated verification of schema changes by comparing database data for the database replication to stored database metadata. The usage parameter analyzed for the database replication may include structured query language (SQL) usage data. Accordingly, analyzing the usage parameter may include tracking SQL language. The user identifier associated with users for an application enables monitoring access of the database replication. The embodied method further includes storing the usage data to a database usage repository and determining from the stored usage data an expected impact of the identified schema change.

In some embodiments, the method includes comparing the expected impact to a threshold impact and informing a client regarding the result. For example, an alarm may be generated for a client application responsive to the expected impact exceeding the threshold impact. The method may also include scheduling the verification process to occur a number N (e.g., 24) times per day. The database or any of the replications of the database may be enabled for production or test environments, as examples.

In another aspect, an embodied method for managing a database system includes identifying a schema change (e.g., a difference between a schema for a data model repository and a schema for another instance of the single database or for a replication), comparing a stored SQL statement against the identified schema change, and determining an application or service development impact for any database errors encountered during the comparing. The method also includes comparing a stored usage parameter to the identified schema change, and in some embodiments, includes combining the stored usage parameter with table data (e.g., column data) or schema information. The method may include preparing a report of applications or services that require review for runtime compatibility based on the combining.

In yet another aspect, embodied systems may include a computer readable media with instructions for a data processing system (e.g., computer) to perform database management. Instructions enable a usage module for analyzing database usage and updating a database usage repository with information indicative of the analyzed database usage. Further instructions enable a schema change monitor that identifies and verifies schema changes and an impact module that determines expected impacts of identified schema changes based on the database usage. Further instructions enable an alarm generator for alerting client applications regarding the change impact. Analyzing database usage may include tracking SQL statements, which may be identified by database sidetracking of SQL statements on a per-user ID basis. Identified SQL statements also may be identified by network packet analysis or source code analysis, as examples. Accordingly, disclosed embodiments identify issues related to the integration of changes in the schema across a single database or different databases (including one or more replications of the single database).

Database schema changes can be automatically identified within any of a single database, between replicated databases (e.g., through a source-replica comparison), and between a database and a data model repository. In some embodiments, applications that perform automated schema change identification within a single database or between replicated databases are extended to compare databases (e.g. Java database connectivity (JDBC) accessible databases) against a data model repository. In this way, applications that identify schema changes are extended to automatically maintain a data model repository. Applications that automatically identify schema changes may be run periodically (e.g., daily) against databases including test and production databases.

SQL usage may be identified by database side tracking of SQL (or table/column) per user ID, by network packet analysis of database communication, and by source code analysis.

Identified SQL statements, on a per application or service basis, can be stored in a data model usage repository. An identified SQL can be parsed for any database objects or components and their corresponding attributes and properties. This includes parsing the identified SQL for schema, table, and column names. As used herein, references to schema, table, and column names are intended to include any and all attributes and properties of corresponding objects and components within the subject database. Such analysis can be used to generate a granular dependency matrix between applications/services and database schemas/tables/columns.

A repository that holds dependency information between systems and database tables/fields permits automatic identification of impacted systems for database schema changes. The automatic identification may be with respect to database schema changes within both a single database or between one or more replications of a database. Such systems may be maintained by assigning a database user ID to each downstream system and requiring that the user ID directly relates to only one downstream system. Repository maintenance and updating functions may include auditing SQL statements (on a database server per user ID) in a test environment. In situations in which such auditing can be done without a relatively large database impact, a production server may accomplish this auditing function. Parsing table and field names out of such audited SQL statements and storing the relations between user ID (i.e. systems) and table/field names may also be performed to maintain the repository.

If SQL statements are complex, parsing field-to-table relations may be complicated. In such situations, table names used in SQL statements may be identified to establish the dependency between user IDs (i.e., systems) and database tables. Such steps may assist in the automation of impact analyses. A repository holding database table/field to user ID (i.e., system) relations could be used for further analysis of database system infrastructure. This may be beneficial in identifying duplicated or overlapping SQL, which may be an indication of redundant interfaces (e.g., two similar Web services with one providing a subset of the other's content). Such a repository may also assist with documenting the end-to-end data element flow, which may support system consolidation planning. Such repositories may also assist with identifying optimization areas such as unknown system interfaces.

Some databases support auditing of database usage to create audit trails. Such audit trails may be written into a system file or into a database table and later analyzed. If a database impact of audit trails is too high or unacceptable, a specialized or separate dedicated network interface packet analyzer may be used as an alternative. Such a dedicated network interface packet analyzer would minimize impact to the database server that may result from conducting the analysis and could be implemented anywhere within the network between the client server and the database server or within the servers themselves. An example application of such a dedicated network interface packet analyzer would copy or capture incoming database protocol packets from a network interface and provide SQL statements to an analyzing application.

It may be important for schema changes for a source database to be synchronized in real-time with a replicated database to prevent breakage in end-to-end data flow. This is important in part because ignoring source changes (e.g., table or field additions) may create replication differences. This may create a risk to data-consuming downstream systems as the replica becomes a subset of the source. Deleting or ignoring synchronization of incompatible source changes (e.g., field delete, rename, and data type changes) may result in a breakage of end-to-end data flow.

For systems that use database replication, downstream systems may become decoupled from source systems, which may make the impact assessment of schema changes relatively complex. For replication of databases between some source systems, it may be required that a notification is sent well before (e.g., one month before) production deployment. This may introduce a risk of production breakage for systems being decoupled from source databases. Incompatible schema changes may require a development impact of those downstream systems to ensure continued end-to-end data flow. The data contained in the replica may become obsolete if data changes to the source do not flow through. Ongoing replication of test or development environments may be achieved on a per system basis. In addition to providing end-to-end infrastructure test environments, this can allow automatically identifying schema changes in early development and testing phases. While testing may be conducted in a preproduction environment, it should be noted that actual production usage data may be utilized in such testing environments in order to better ensure continued end-to-end data flow.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 illustrates a system for database management that includes detecting database schema changes. As shown, the system in FIG. 1 includes database 161 and database replication 109, which is intended to be an exact or near exact replica of database 161 (i.e., a database replication). As shown, database 161 includes schema 111 and database replication 109 include schema 113. It is noted that although depicted with database replication 109, the system in FIG. 1 may be utilized for detecting changes occurring solely within the schema for different instances of a single database such as database 161 or database 109 (rather than differences between the schema of database 161 and database replication 109). Disclosed embodiments can detect differences between schema 113 and schema 111. While difference between schema 113 and 111 may be detected, it is noted that differences in stored schema 119 and schema 113 (or stored schema 119 and schema 111) can be detected as well so as to permit detection of differences in separate instances of database 161 and/or database replication 109 (i.e., changes in a single database). Database replication 109 may be enabled for a test environment, a production environment, or any combination thereof. Data processing system 169 is communicatively coupled through network 163 to database 161 and through network 165 to database replication 109. As such, database 161 and database replication 109 may be distributed in different physical locations, for example at different sites in an enterprise (e.g., corporation). Data processing system 169 includes network interface controller 179 and processor 157 for executing machine readable instructions (e.g., instructions 155) for detecting database schema changes and downstream effects of changes in schema 113 and schema 111. Such machine-readable instructions may be stored on media 159, which for example may be one or more computer hard drives, disks, chips, or other memory.

As shown, media 159 includes instructions 155 and data storage 107 which includes database repository data. As shown, instructions 155 include applications 101, packet analyzer 135, SQL statement preparer module 137, change verifier module 139, source code analyzer module 141, usage analyzer module 143, data storage module 145, impact determination module 147, alarm generator module 149, change identifier module 151, and database error determination module 153. Applications 101 are not necessarily loaded into the same server as schema change monitoring applications (e.g., packet analyzer module 135, change verifier module 139, change identifier module 151, etc.). In addition applications 101 are not necessarily stored in the same location as such schema change monitoring applications. Furthermore, media 159 may include multiple chips, disks, or other forms of computer readable media in different servers or different locations. To that end, applications 101, packet analyzer 135, SQL statement preparer module 137, change verifier module 139, source code analyzer module 141, usage analyzer module 143, data storage module 145, impact determination module 147, alarm generator module 149, change identifier module 151, and database error determination module 153 may not be co-located, but rather, may be part of a widely distributed environment.

Data storage 107 includes user IDs 103, prepared SQL statements 115, expected impact 117, stored schema 119, database metadata 121, database usage data 125, table data 127, column data 129, schema names 131, and dependency matrix data 133. As shown, media 159 includes data storage 107 and instructions 155. Instructions 155 represent a portion of media 159 that is embedded with computer executable instructions. Data storage 107 represents a portion of media 159 for storing data (e.g., user IDs 103, expected impact 117, etc.) that are generated or accessed by elements (e.g., modules) included in instructions 155. For example, modules within instructions 155 that monitor and characterize schema changes can store related data within one or more elements of data storage 107. Also, data storage 107 may include a model schema (e.g., stored schema 119) used in detecting whether a schema for a single database or its replication has deviated from the stored model. FIG. 1 shows media 159 having separate components including instructions 155 and data storage 107. Showing these elements as separate components is for illustrative purposes only and is not intended to limit the manner in which a disclosed embodiment stores, arranges, or accesses such elements (including whether such elements are co-located (in whole or part) or dispersed within a distributed environment).

User IDs 103 may be associated individually, on a one-to-one basis, with applications 101. For example, user ID 103-1 may be associated with application 101-1, user ID 103-2 may be associated with application 101-2, and so on. User IDs 103 can be unique to each application, and an application therefore may allow access to only one such user ID.

Change identifier module 151 conducts monitoring of schema 113 to detect a change to schema 113 as compared to schema 111. Further, change identifier module 151 may use stored schema 119 and/or metadata 121 to conduct monitoring of schema 111 and/or schema 113 to detect a change to different instances of schema 113 and/or schema 111, respectively. Change verifier module 139 verifies changes identified by change identifier module 151. Verifying may include performing repeated verification of schema changes by comparing database usage data 125 (e.g., for database replication 109 and/or database 161) to stored database metadata 121. In some embodiments, such verification may be scheduled to occur a number N times (e.g., 24 times) per day. Usage analyzer module 143 analyzes a usage parameter (e.g., of database replication 109 and/or database 161) to determine usage data. The analyzed usage parameter, for example, may include SQL usage data that can be tracked. Usage data is stored to data storage 107 as database usage data 125, which is part of a database usage repository. The usage data is used to determine an expected impact, stored as expected impact 117, as determined by impact determination module 147. The expected impact 117 may be compared to a threshold impact and a client application (e.g., application 101-3) may be informed regarding the result of the comparing (e.g., the client application is informed of expected impact 117). Alarm generator 149 generates an alarm for a client application (e.g., application 101-2) in response to the expected impact (e.g., expected impact 117) exceeding the threshold impact.

In other exemplary embodiments, data processing system 169 executes selected instructions 155 for managing database 161 and database replication 109 to detect schema changes and anticipate resulting impacts of the changes. Detected schema changes may be within different instances of database 161 or within different instances of database replication 109 in addition to schema changes between instances of database 161 and database replication 109. In a particular embodiment, change identifier module 151 identifies a schema change between schema 113 and schema 111. In some embodiments, the schema change may include a difference between a schema for a data model repository (e.g., stored schema 119) and a schema for a database replication (e.g., schema 113). In other embodiments, change identifier module 151 identifies a schema change between different instances of database 161 and/or different instances of database replication 109. In some embodiments, the schema change may include a difference between schema for database 161 and stored schema for database 161 (e.g., stored schema 119 and/or metadata 121). In further embodiments, the schema change may include a difference between schema for database replication 109 and stored schema for database replication 109 (e.g., stored schema 119 and/or metadata 121). A stored SQL statement may be compared against any identified schema changes (including schema changes internal to a single database and/or schema changes between a database and a database replication). For any database error encountered during the comparing, a determination may be made regarding any applications 101 or services that may be impacted. The expected impact may be stored as expected impact 117 within data storage 107. A stored usage parameter, for example an element within database usage data 125, may be compared to the identified schema change.

Stored usage parameters (e.g., database usage data 125) may include schema information such as schema names 131 and dependency matrix data 133. In some embodiments, a stored usage parameter may be combined with column data 129 or table data 127. Based on this combining, a report may be compiled of applications or services that require review for runtime compatibility.

In some embodiments, usage analyzer module 143 analyzes database usage and updates a database usage repository (e.g., data storage 107) with information indicative of database usage. Further instructions enable change identifier module 151 and change verifier module 139 to identify and verify schema changes. Impact determination module 147 determines an impact of an identified schema change based on database usage as determined by usage analyzer module 143. Alarm generator 149 alerts client applications (e.g., application 101-1) regarding expected impact changes. Analyzing database usage may include tracking SQL statements. SQL statements may be identified by database side tracking of SQL statements on a per-user ID basis. Identified SQL statements may be identified by network packet analysis performed by packet analyzer 135. Alternatively, SQL statements may be identified by source code analysis performed by source code analyzer 141.

Figure 2:
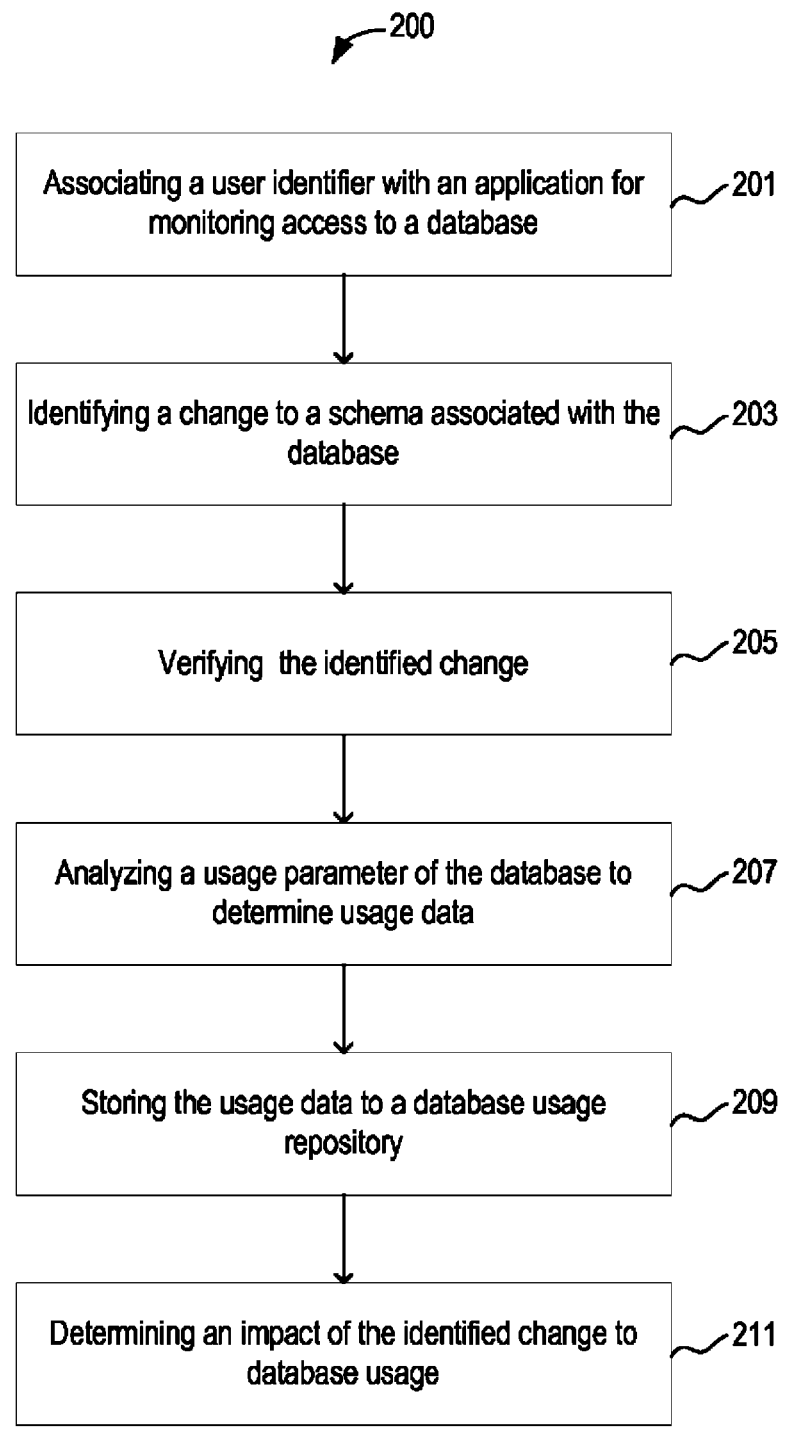
FIG. 2 depicts a method of database management for determining the expected impact of a database schema.

FIG. 2 illustrates selected components of a disclosed method 200 for detecting and reacting to schema changes. As shown, method 200 includes associating (block 201) a user identifier with an application for controlling access to a database, identifying (block 203) a change to a schema associated with the database, and verifying (block 205) the identified change. Method 200 further includes analyzing (block 207) a usage parameter of the database to determine usage data and storing (block 209) the usage data to a data usage repository. Finally, the impact of the identified change to database usage is determined (block 211). It will be appreciated that method 200 may be used for detecting schema changes within different instances of a database (such as database 161) or within different instances of database replication (such as database 109) or between instances of a database (such as database 161) and a database replication (such as database replication 109).

Figure 3:
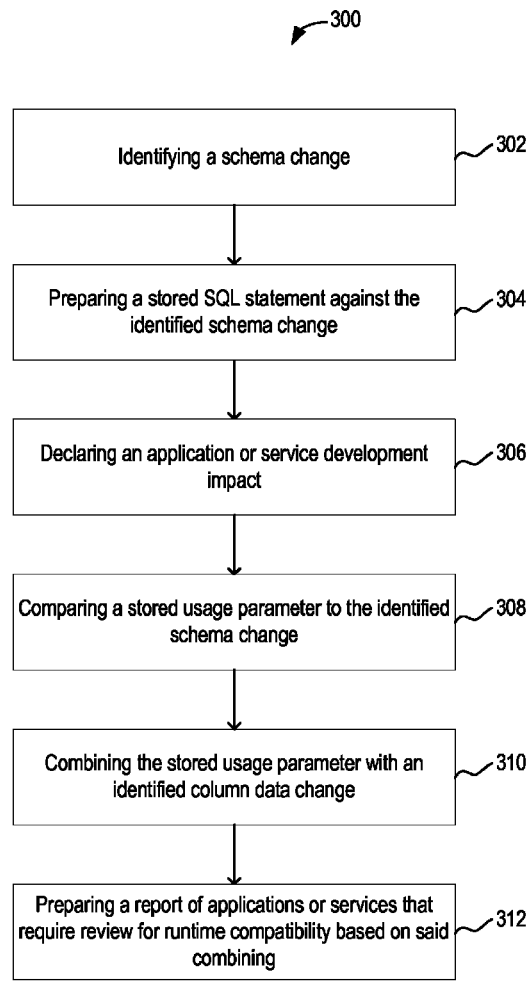
FIG. 3 depicts an additional method of database management for determining the expected impact of a monitored database schema.

FIG. 3 illustrates a method 300 for detecting database schema changes and determining anticipated effects from such changes. As shown, a schema change is identified (block 302), and a stored SQL statement against the identified schema change is prepared and/or may be executed (block 304). An application or service development impact is declared (block 306) and a stored usage parameter is compared (block 308) to the identified schema change. The usage parameter is combined with an identified column data change (block 310) and, finally, a report of applications or services that may require review for runtime compatibility based on the combining is prepared (block 312). It will be appreciated that method 300 may be used for detecting schema changes within different instances of a database (such as database 161) or within different instances of database replication (such as database 109) or between instances of a database (such as database 161) and a database replication (such as database replication 109).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for database management, comprising:
storing, in memory, a replication of a source database associated with a schema;
assigning, by a processor, a unique database user identification to each downstream client system accessing the source database;
receiving database query statements, each database query statement identifying a software application accessing a name of a database table and the unique database user identification assigned to each downstream client system issuing each database query statement;
storing, in the memory, a dependency matrix for the replication of the source database, the dependency matrix associating the unique database user identification assigned to each downstream client system and to the name of the database table identified in each database query statement;
monitoring the dependency matrix for an impact to the software application;
identifying, based on the monitoring, a change to the schema of the replication of the source database;
verifying the change by repeatedly comparing database data for the replication of the source database to metadata for the source database; and
responsive to the verifying of the change, informing the software application of the impact due to the change to the schema of the replication of the source database.

2. The method of claim 1, further comprising comparing the impact to a threshold impact.

3. The method of claim 2, further comprising generating an alarm in response to the impact exceeding the threshold impact.

4. The method of claim 1, further comprising comparing the impact to the software application to the database query statements.

5. The method of claim 1, further comprising comparing the impact to the software application to one of the database query statements.

6. The method of claim 1, further comprising repeating the verifying verification of the change.

7. The method of claim 1, further comprising periodically repeating the verifying verification of the change.

8. The method of claim 1, further comprising associating one of the database query statements to a column of the replication of the source database.

9. The method of claim 1, further comprising parsing each database query statement to identify the software application, the name of the database table, and the unique database user identification.

10. The method of claim 1, further comprising performing network packet analysis to identify the software application, the name of the database table, and the unique database user identification.

11. The method of claim 1, further comprising source code analysis to identify the software application, the name of the database table, and the unique database user identification.

12. The method of claim 1, further comprising associating the software application to the unique database user identification.

13. A database management system, comprising:
a processor; and
memory storing instructions that, when executed by the processor, cause the processor to perform operations, the operations comprising:
synchronizing a database replication associated with a source database and associated with a schema;
assigning a unique database user identification to each downstream client system accessing the source database;
receiving database query statements, each database query statement identifying a software application accessing a name of a database table and the unique database user identification assigned to each downstream client system issuing each database query statement;
storing a dependency matrix for the database replication, the dependency matrix associating the unique database user identification assigned to each downstream client system and to the name of the database table identified in each database query statement;
monitoring the dependency matrix for an impact to the software application;
identifying, based on the monitoring, a change to the schema of the database replication;
verifying the change by repeatedly comparing database data for the database replication to metadata for the source database; and responsive to the verifying of the change, informing the software application of the impact due to the change to the schema of the database replication.

14. The system of claim 13, wherein the operations further comprise synchronizing in substantially real-time.

15. The system of claim 13, wherein the operations further comprise comparing the impact to a threshold.

16. The system of claim 15, wherein the operations further comprise generating an alarm in response to the impact exceeding the threshold.

17. The system of claim 13, wherein the operations further comprise comparing the impact to the database query statements.

18. A memory storing instructions that, when executed by a processor, cause the processor to perform operations, the operations comprising:

storing a replication of a source database associated with a schema;

assigning a unique database user identification to each downstream client system accessing the source database;

receiving database query statements, each database query statement identifying a software application accessing a name of a database table and the unique database user identification assigned to each downstream client system issuing each database query statement;

storing a dependency matrix for the replication of the source database, the dependency matrix associating the unique database user identification assigned to each downstream client system and to the name of the database table identified in each database query statement;

monitoring the dependency matrix for an impact to the software application;

identifying, based on the monitoring, a change to the schema of the replication of the source database;

verifying the change by repeatedly comparing database data for the replication of the source database to metadata for the source database; and responsive to the verifying of the change, informing the software application of the impact due to the change to the schema of the replication of the source database.

19. The memory according to claim 18, wherein the operations further comprise comparing the impact to a threshold.

20. The memory according to claim 19, wherein the operations further comprise generating an alarm.

* * * * *